United States Patent
Tsai

(10) Patent No.: US 11,610,390 B2
(45) Date of Patent: Mar. 21, 2023

(54) SYSTEM FOR DETECTING SURFACE TYPE OF OBJECT AND ARTIFICIAL NEURAL NETWORK-BASED METHOD FOR DETECTING SURFACE TYPE OF OBJECT

(71) Applicant: GETAC TECHNOLOGY CORPORATION, Hsinchu County (TW)

(72) Inventor: Kun-Yu Tsai, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 309 days.

(21) Appl. No.: 16/848,423

(22) Filed: Apr. 14, 2020

(65) Prior Publication Data

US 2020/0364559 A1 Nov. 19, 2020

Related U.S. Application Data

(60) Provisional application No. 62/848,216, filed on May 15, 2019.

(51) Int. Cl.

| | |
|---|---|
| *G06V 10/60* | (2022.01) |
| *G06T 7/586* | (2017.01) |
| *G06T 7/00* | (2017.01) |
| *G06N 3/08* | (2006.01) |
| *G01N 21/88* | (2006.01) |

(Continued)

(52) U.S. Cl.
CPC ............ *G06V 10/60* (2022.01); *G01J 3/2823* (2013.01); *G01N 21/01* (2013.01); *G01N 21/3581* (2013.01); *G01N 21/8851* (2013.01); *G01N 21/952* (2013.01); *G01N 21/956* (2013.01); *G06F 17/16* (2013.01); *G06K 9/6257* (2013.01); *G06N 3/04* (2013.01); *G06N 3/0472* (2013.01); *G06N 3/063* (2013.01); *G06N 3/08* (2013.01); *G06T 7/0004* (2013.01); *G06T 7/11* (2017.01); *G06T 7/40* (2013.01); *G06T 7/45* (2017.01); *G06T 7/586* (2017.01); *G06T 7/97* (2017.01); *G06V 10/143* (2022.01); *G06V 10/22* (2022.01); *G06V 10/242* (2022.01); *G06V 10/25* (2022.01); *G06V 20/64* (2022.01); *G06V 20/647* (2022.01); *G01N 2021/8887* (2013.01);

(Continued)

(58) Field of Classification Search
CPC ........ G01N 21/956; G06N 3/08; G01J 3/2823
See application file for complete search history.

(56) References Cited

U.S. PATENT DOCUMENTS

| | | | |
|---|---|---|---|
| 7,667,834 B2 * | 2/2010 | Clasen | ................... G01N 21/91 |
| | | | 356/237.1 |
| 11,244,436 B2 * | 2/2022 | Lee | ......................... G06T 5/002 |

(Continued)

*Primary Examiner* — Boubacar Abdou Tchoussou

(57) ABSTRACT

An artificial neural network-based method for detecting a surface type of an object includes: receiving a plurality of object images, wherein a plurality of spectra of the plurality of object images are different from one another and each of the object images has one of the spectra; transforming each object image into a matrix, wherein the matrix has a channel value that represents the spectrum of the corresponding object image; and executing a deep learning program by using the matrices to build a predictive model for identifying a target surface type of the object. Accordingly, the speed of identifying the target surface type of the object is increased, further improving the product yield of the object.

11 Claims, 10 Drawing Sheets

(51) Int. Cl.

| | |
|---|---|
| *G06T 7/40* | (2017.01) |
| *G01N 21/956* | (2006.01) |
| *G01N 21/01* | (2006.01) |
| *G01N 21/952* | (2006.01) |
| *G06V 10/22* | (2022.01) |
| *G06V 10/25* | (2022.01) |
| *G06V 10/143* | (2022.01) |
| *G06K 9/62* | (2022.01) |
| *G01N 21/3581* | (2014.01) |
| *G06N 3/04* | (2006.01) |
| *G06T 7/11* | (2017.01) |
| *G01J 3/28* | (2006.01) |
| *G06T 7/45* | (2017.01) |
| *G06F 17/16* | (2006.01) |
| *G06N 3/063* | (2006.01) |
| *G06V 10/24* | (2022.01) |
| *G06V 20/64* | (2022.01) |

(52) U.S. Cl.
CPC .......... *G06T 2207/10152* (2013.01); *G06T 2207/20081* (2013.01); *G06T 2207/20084* (2013.01)

(56) References Cited

U.S. PATENT DOCUMENTS

| | | | | |
|---|---|---|---|---|
| 2008/0297780 | A1* | 12/2008 | Clasen | G01N 21/8903 356/237.2 |
| 2011/0224918 | A1* | 9/2011 | Floeder | G01N 21/8922 702/35 |
| 2015/0212008 | A1* | 7/2015 | Sasamoto | G06T 7/0004 348/86 |
| 2017/0365050 | A1* | 12/2017 | Kurahashi | G01B 11/30 |
| 2020/0175352 | A1* | 6/2020 | Cha | G06T 7/001 |
| 2020/0364849 | A1* | 11/2020 | Zhang | G06T 5/002 |
| 2021/0018446 | A1* | 1/2021 | Terahai | G01N 21/95692 |
| 2021/0042910 | A1* | 2/2021 | Lee | G06T 7/586 |

* cited by examiner

SYSTEM FOR DETECTING SURFACE TYPE OF OBJECT AND ARTIFICIAL NEURAL NETWORK-BASED METHOD FOR DETECTING SURFACE TYPE OF OBJECT

CROSS-REFERENCE TO RELATED APPLICATIONS

This application claims priority from U.S. Patent Application Ser. No. 62/848,216, filed on May 15, 2019, the entire disclosure of which is hereby incorporated by reference.

BACKGROUND OF THE INVENTION

Field of the Invention

The present invention relates to a system for detecting a surface type of an object and an artificial neural network-based method for detecting a surface type of an object, and more particularly, to a system capable of learning and automatically detecting various surface types such as slots, cracks, bumps and patterns of an object, and a neural network training system thereof.

Description of the Prior Art

Various safety protection measures are consisted of numerous small structural elements, such as safety belts. If these small structural elements have insufficient strength or other defects, safety concerns of the safety protection measures can be resulted.

Due to various reasons during a manufacturing process, such as unintentional impacts or mold defects, minute slots, cracks, bumps and textures can be resulted on surfaces of these small or miniature structural elements, and these minute defects cannot be easily observed. In one conventional defect detection method, a product under detection is observed by the naked eyes or touched by hands. However, inspecting by such manual detection method to determine whether a product is defective has poor efficiency and is susceptible to misjudgment.

SUMMARY OF THE INVENTION

In view of the above, the present invention provides a method for detecting a surface type of an object and an artificial neural network-based method for detecting a surface type of an object, the system and method being capable of providing an accurate detection result and quickly detecting minute defects and/or identifying fine textures on a surface of an element. Herein, the minute defect is a three-dimensional structure.

In one embodiment, a system for detecting a surface type of an object includes a driver component, a light source component, a photosensitive element, and a spectroscopic component. The driver component carries the object, a surface of the object is divided along a first direction into a plurality of areas, and the driver component is further for sequentially moving one of the plurality of areas to a detection position. The light source component is configured to face the detection position, and provides multi-spectrum light to illuminate the detection position, wherein the multi-spectrum light includes sub-light having a plurality of spectra and is opposite to a normal line of the area located at the detection position. Herein, a light incident angle of the light is more than a critical angle and less than or equal to 90 degrees. The photosensitive element is configured to face the detection position, wherein a photosensitive axis of the photosensitive element is parallel to the normal line or between the normal line and the first direction. The spectroscopic component is located between the photosensitive element and the detection position, and has a plurality of filter regions respectively corresponding to the plurality of spectra. The photosensitive element captures a detection image of the area located at the detection position under the sub-light of each of the spectra by means of each of the filter regions.

In one embodiment, a system for detecting a surface type of an object includes a driver component, a light source component and a photosensitive element. The driver component carries the object, a surface of the object is divided along a first direction into a plurality of areas, and the driver component is for sequentially moving one of the plurality of areas to a detection position. The light source component is configured to face the detection position, and sequentially provides light of a plurality of spectra to illuminate the detection position, wherein a light incident angle of the light of each spectrum is more than a critical angle and less than or equal to 90 degrees relative to a normal line of the area located at the detection position. The photosensitive element is configured to face the detection position, and captures a detection image of the area located at the detection position under the light of each spectrum, wherein a photosensitive axis of the photosensitive element is parallel to the normal line or between the normal line and the first direction.

In one embodiment, an artificial neural network-based method for detecting a surface type of an object includes: receiving a plurality of object images, wherein a plurality of spectra of the plurality of object images are different from one another, and each object image has one of the plurality of spectra; transforming the plurality of object images into matrices, wherein each matrix has a channel value, and the plurality of channel values respectively represent the plurality of spectra; and executing a deep learning program by the matrices so as to build a predictive model for identifying a target surface type of the object.

In conclusion, in the system for detecting a surface type of an object and an artificial neural network-based method for detecting a surface type of an object according to an embodiment of the present invention, object images having different imaging effects are provided for the same object by controlling an emission spectrum or an absorption spectrum, thereby enhancing differentiation for various target surface types of an object under image detection. In the system for detecting a surface type of an object and an artificial neural network-based method for detecting a surface type of an object according to an embodiment of the present invention, images of surface textures of multiple spectra can be integrated so as to improve identification for a target surface type of an object, thereby obtaining surface roughness and a fine texture pattern of an object. In the system for detecting a surface type of an object and an artificial neural network-based method for detecting a surface type of an object according to an embodiment of the present invention, a target surface type of an object can be independently determined by an artificial neural network, such that an inspector is not required to observe the object by naked eyes or touch the object by hands, thereby significantly improving identification efficiency for a target surface type as well as mitigating human misjudgment.

DETAILED DESCRIPTION OF THE EMBODIMENTS

Figure 1:
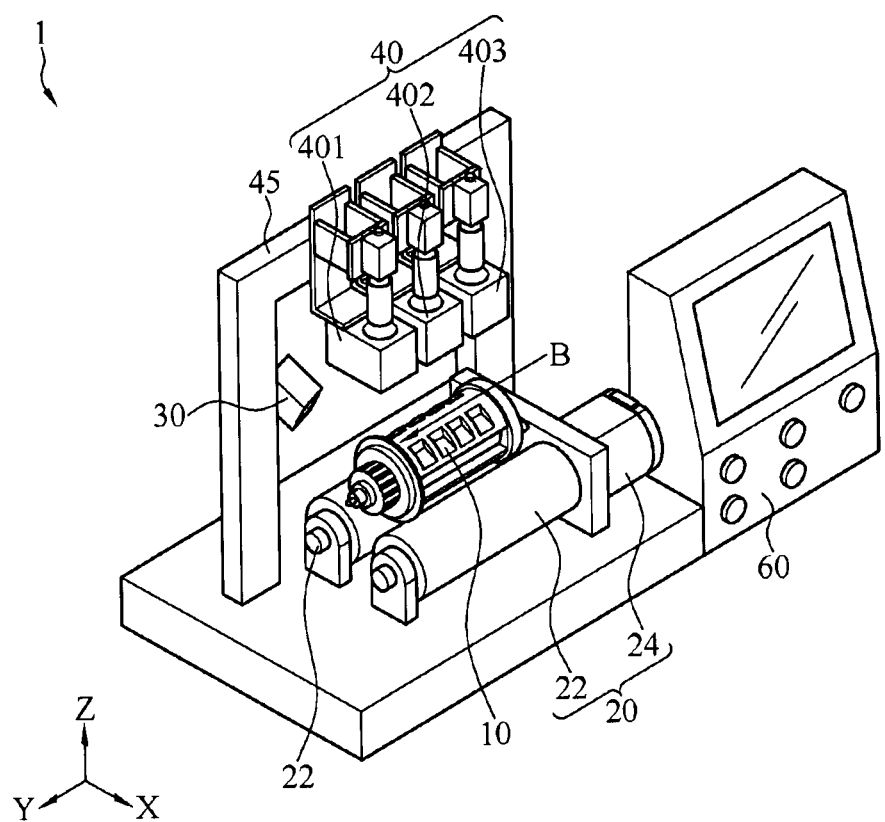
FIG. 1 is a perspective appearance schematic diagram of a system for detecting a surface type of an object according to an embodiment of the present invention.
Figure 2:
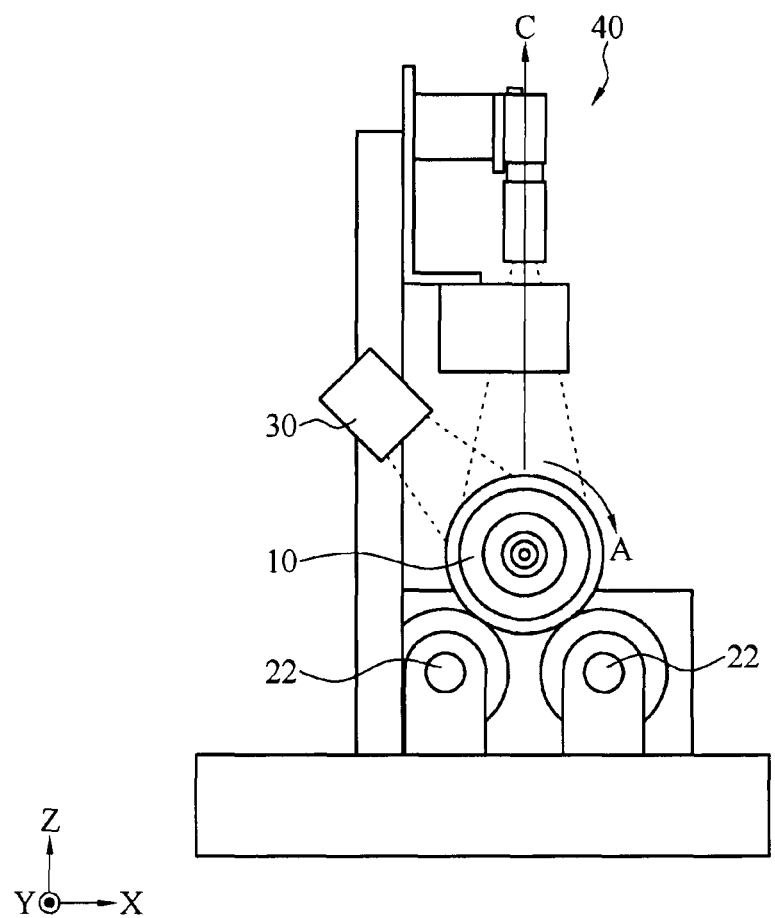
FIG. 2 is a side schematic diagram of a system for detecting a surface type of an object according to another embodiment of the present invention.
Figure 3:
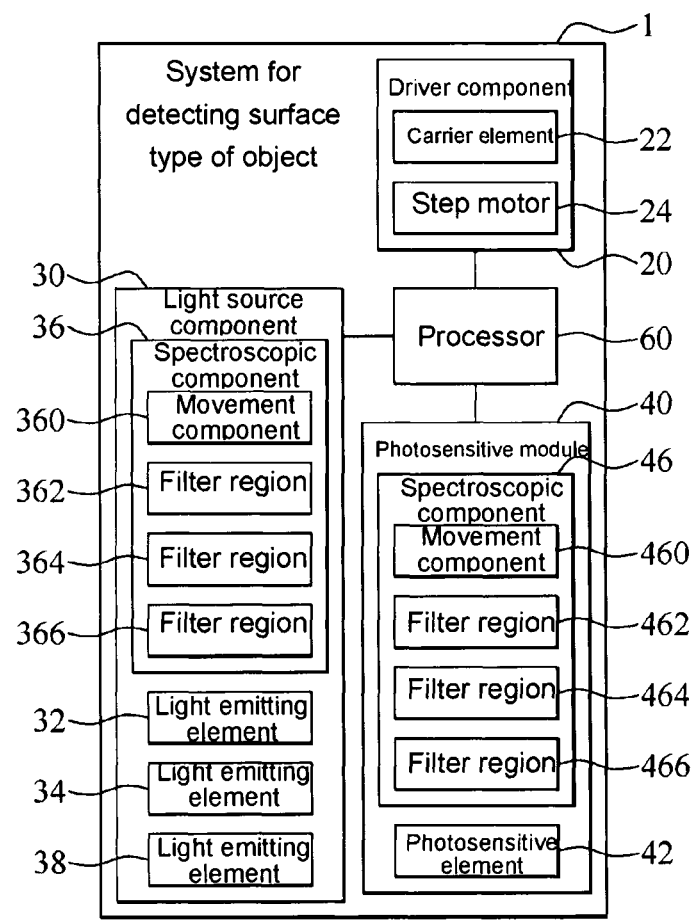
FIG. 3 is a block diagram of a system for detecting a surface type of an object according to an embodiment of the present invention.

FIG. 1 shows a perspective appearance schematic diagram of a system for detecting a surface type of an object according to an embodiment of the present invention. FIG. 2 shows a side schematic diagram of a system for detecting a surface type of an object according to another embodiment of the present invention. FIG. 3 shows a block diagram of a system for detecting a surface type of an object according to an embodiment of the present invention. Referring to FIG. 1 and FIG. 2, in one embodiment, a system 1 for detecting a surface type of an object is suitable for scanning an object 10 so as to obtain detection images of the object 10 under different spectra. In some embodiments, the surface of the object 10 can include at least one surface type (for example, surface structures such as slots, cracks, bumps, ridges and dents, edges, surface defects, surface roughness, and minute textures), and image blocks of the surface types are also presented in a corresponding detection image. Wherein, the surface defect is a three-dimensional structure. Herein, the three-dimensional fine structure is in a scale of submicron (<1 μm, e.g., 0.1 μm to 1 μm) to micron (μm); that is, the longest side or the longest diameter of the three-dimensional structure is in a scale between submicron and micron. For example, the three-dimensional structure is a micro-structure of 300 nm to 6 μm.

Herein, the system 1 for detecting a surface type of an object includes a driver component 20, a light source component 30 and a photosensitive module 40. The driver component 20 is for carrying the object 10, and has a detection position. The light source component 30 and the photosensitive module 40 are configured to face the detection position from different angles, respectively.

Figure 4:
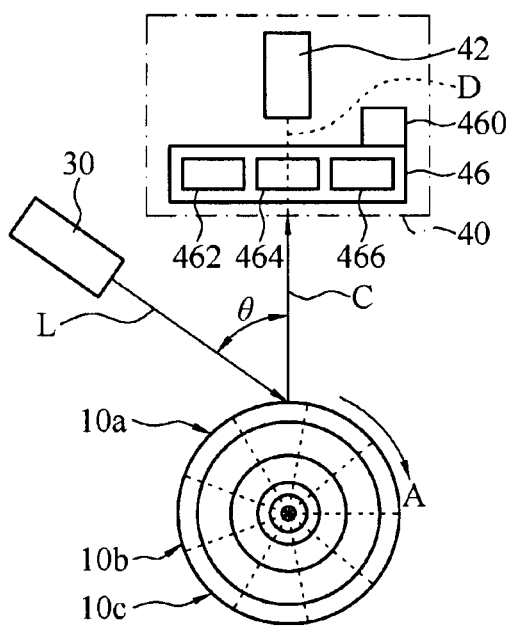
FIG. 4 is a schematic diagram of directions of light in a system for detecting a surface type of an object according to an embodiment of the present invention.

FIG. 4 shows a schematic diagram of directions of light in a system for detecting a surface type of an object according to an embodiment of the present invention. During the operation of the system 1 for detecting a surface type of an object, the surface of the object 10 can be divided along a first direction A into a plurality of areas 10a, 10b and 10c, and the driver component 20 sequentially moves one of the plurality of areas 10a, 10b and 10c to the detection position. In some embodiments, assuming that the surface of the object 10 is divided into nine areas for example, three areas 10a, 10b and 10c are denoted as an example in FIG. 4. However, the present invention is not limited to the above example. The surface of the object 10 can also be divided into areas of other quantities according to actual requirements, for example, any quantity such as 3, 5, 11, 15 or 20.

The light source component 30 provides light to illuminate the detection position. The photosensitive module 40 captures, under the light provided by the light source component 30, detection images of the areas on the surface of the object 10 sequentially located at the detection position. In one embodiment, the light source component 30 provides light of different spectra from a lateral or inclined direction.

In one embodiment, assuming that the object 10 is cylindrical in shape, by rotating the object 10 along the first direction A by using the driver component 20, the areas 10a, 10b and 10c of the object 10 are sequentially moved to the detection position for the photosensitive module 40 to obtain the detection images. In some embodiments, the first direction A can be a clockwise direction or a counterclockwise direction.

In one embodiment, the driver component 20 includes a carrier element 22 and a step motor 24. The step motor 24, connected to the carrier element 22, carries the object 10 during the operation of the system 1 for detecting a surface type of an object, and rotates the carrier element 22 so as to drive the object 10 to rotate and to sequentially move the plurality of areas to the detection position.

In one example, the carrier element 22 can be two rollers spaced by a predetermined distance, and the step motor 24 is coupled to rotating shafts of the two rollers. Herein, the predetermined distance is less than the diameter of the object 10 (the minimum diameter of the body). Thus, the object 10 can be movably arranged between the two rollers. Furthermore, while the step motor 24 rotates the two rollers, the object 10 is driven and hence rotated due to the surface frictional force between the object 10 and the two rollers.

In another example, the carrier element 22 can be a rotating shaft, and the step motor 24 is coupled to one end of the rotating shaft. At this point, the other end of the rotating shaft is provided with an embedding member (e.g., an insertion slot). At this point, the object 10 can be detachably embedded in the embedding member. Furthermore, while the step motor 24 rotates the rotating shaft, the object 10 is driven and hence rotated by the rotating shaft.

For example, during the detection procedure, the driver component 20 first moves the area 10a to the detection position, and a photosensitive element 42 captures a detection image of the area 10a when the detection light provided by the light source component 30 is illuminating the area 10a. Next, the driver component 20 moves the object 10 such that the area 10b is moved to the detection position, and the photosensitive element 42 again captures a detection image of the area 10b when the detection light provided by the light source component 30 is illuminating the area 10b. Next, the driver component 20 moves the object 10 such that the area 10c is moved to the detection position, and the photosensitive element 42 again captures a detection image of the area 10c when the detection light provided by the light source component 30 is illuminating the area 10c. The steps above are repeated similarly, until the detection images of all areas have been captured.

Figure 5:
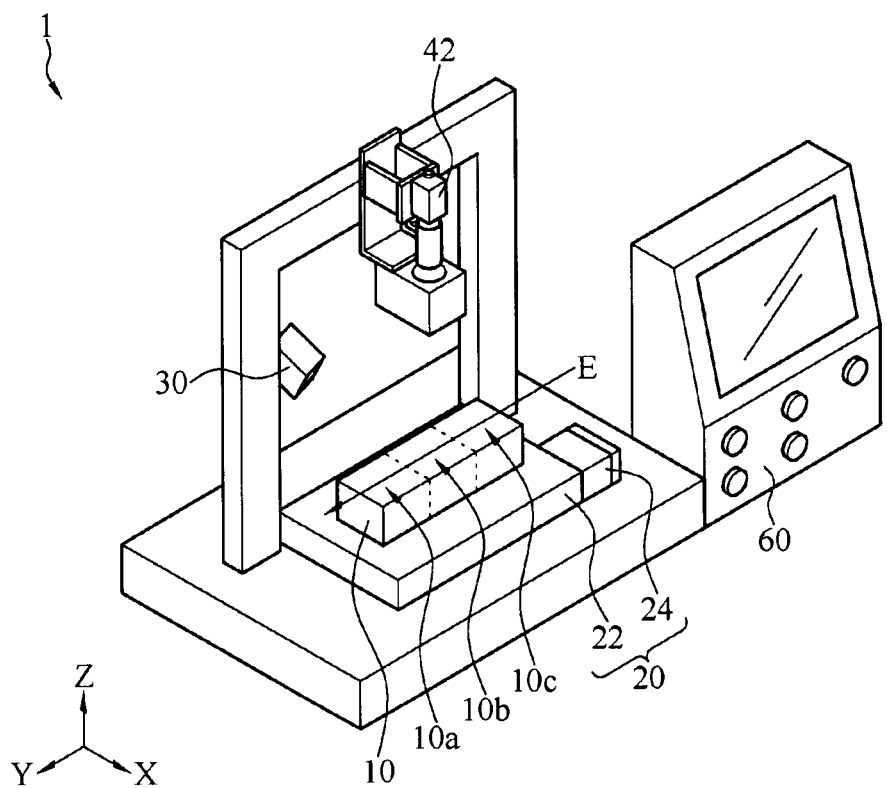
FIG. 5 is a perspective appearance schematic diagram of a system for detecting a surface type of an object according to another embodiment of the present invention.

FIG. 5 shows a perspective appearance schematic diagram of a system for detecting a surface type of an object according to another embodiment of the present invention. In one embodiment, during the operation of the system for detecting a surface type of an object, the carrier element 22 carries the object 10, and the step motor 24 rotates the carrier element 22 so as to drive the object 10 to move the plurality of areas along the first direction to the detection position. In one embodiment, assuming that the object 10 is a plate, it is equivalently that the surface of the object 10 is a non-curved surface having a curvature of being equal to zero or approximately equal to zero. The object 10 is moved along a first direction E by using the driver component 20, so as to sequentially move the areas 10a, 10b and 10c on the surface of the object 10 to the detection position for the photosensitive module 40 to obtain detection images. Herein, the first direction E can be an extension direction of any side (e.g., the long side) of the surface of the object 10. In one example, the carrier element 22 can be a planar carrier plate, and the step motor 24 is coupled to one side of the planar carrier plate. At this point, in the detection procedure, the object 10 is detachably arranged on the planar carrier plate. The step motor 24 drives the planar carrier plate to move along the first direction E and to drive the object 10 to move, so as to align an area to the detection position. Herein, the step motor 24 drives the planar carrier plate to move by a predetermined distance each time, and repeatedly drives the planar carrier plate to move so as to sequentially move the areas 10a, 10b and 10c to the detection position. Herein, the predetermined distance is substantially equal to the width of the areas 10a, 10b and 10c along the first direction E.

Figure 6:
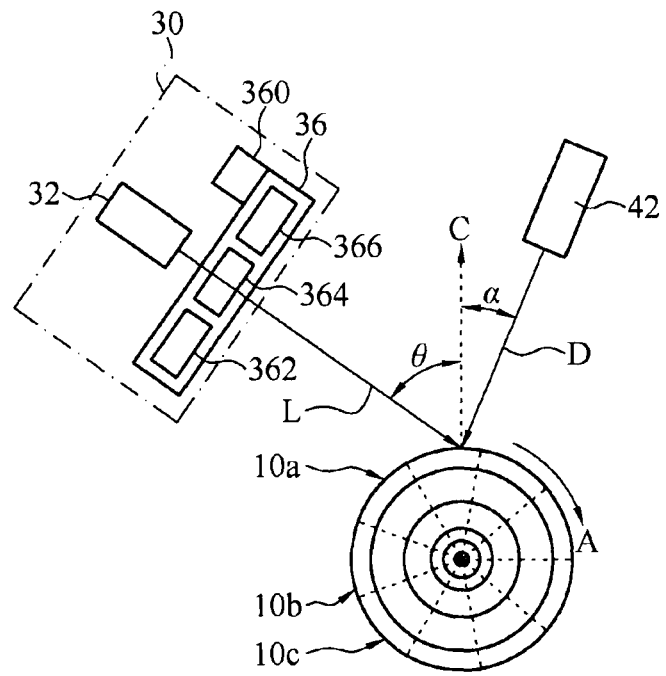
FIG. 6 is a schematic diagram of directions of light in a system for detecting a surface type of an object according to another embodiment of the present invention.

FIG. 6 shows a schematic diagram of directions of light in a system for detecting a surface type of an object according to another embodiment of the present invention. Also refer to FIG. 4 and FIG. 6. In one embodiment, the photosensitive module 40 includes the photosensitive element 42 and a spectroscopic component 46. The spectroscopic component 46 is located between the photosensitive element 42 and the detection position; alternatively speaking, the spectroscopic component 46 is located between the photosensitive element 42 and the object 10. The spectroscopic component 46 includes a plurality of filter regions 462, 464 and 466 respectively corresponding to a plurality of spectra, and a movement component 460. At this point, the light source component 30 provides multi-spectrum light to illuminate the detection position. Herein, the multi-spectrum light has sub-light of a plurality of spectra. Thus, by switching the filter regions 462, 464 and 466 of the spectroscopic component 46, the filter regions 462, 464 and 466 are individually driven and moved to the photosensitive axis of the photosensitive element 42, hence enabling the photosensitive element 42 to capture, under the sub-light of individual spectra by means of the filter regions 462, 464 and 466, detection images of the area located at the detection position with respect to multiple different spectra. That is to say, when the multi-spectrum light from the light source component 30 illuminates upon the object 10 at the detection position, the multi-spectrum light is reflected by the surface of the object 10, and the reflected light is filtered by any of the filter regions 462, 464 and 466 of the spectroscopic component 46 to become the sub-light of the spectrum of the corresponding filter region and then enters a sensing region of the photosensitive element 42, and at this point, only one single spectrum (an intermediate value of an optical waveband) remains in the sub-light arriving at the photosensitive element 42. When the same filter region 462, 464 or 466 is aligned with the photosensitive axis of the photosensitive element 42, the driver component 20 moves one area 10a, 10b or 10c each time to the detection position, and the photosensitive element 42 captures once after each movement the detection image of the area 10a, 10b or 10c currently located at the detection position, so as to obtain the detection images of all the areas 10a, 10b and 10c on the surface under the same spectrum. Then, the spectroscopic component 46 switches to and aligns another filter region 462, 464 or 466 with the photosensitive axis of the photosensitive element 42, and again sequentially moves the areas 10a, 10b and 10c and captures the detection images of the areas 10a, 10b and 10c. The steps above are repeated similarly to obtain the detection images having the spectra respectively corresponding to the filter regions 462, 464 and 466.

In some embodiments, the photosensitive module 40 can include a movement component 460, and the movement component 460 is coupled to the spectroscopic component 46 and a processor 60. During the operation of the system 1 for detecting a surface type of an object, under the control of the processor 60, the movement component 460 sequentially moves one of the filter regions 462, 464 and 466 of the spectroscopic component 46 to a photosensitive axis D of the photosensitive element 42.

In some embodiments, the optical waveband of the multi-spectrum light provided by the light source component 30 can be between 300 nm and 2,100 nm, and the optical wavebands individually allowed to pass through the multiple filter regions 462, 464 and 466 of the spectroscopic component 46 are respectively any non-overlapping sections between 300 nm and 2,100 nm. Herein, the optical wavebands individually allowed to pass through the multiple filter regions 462, 464 and 466 of the spectroscopic component 46 can be continuous or discontinuous. For example, assuming that the optical waveband of the multi-spectrum light is between 300 nm and 2,100 nm, the optical wavebands individually allowed to pass through the multiple filter regions of the spectroscopic component 46 can be 300 nm to 600 nm, 600 nm to 900 nm, 900 nm to 1,200 nm, 1,200 nm to 1,500 nm, 1,500 nm to 1,800 nm, and 1,800 nm to 2,100 nm. In another example, assuming that the optical waveband of the multi-spectrum light is between 380 nm and 750 nm, the optical wavebands individually allowed to pass through the multiple filter regions of the spectroscopic component 46 can be 380 nm to 450 nm, 495 nm to 570 nm, and 620 nm to 750 nm.

In another example, the optical wavelength of the detection light can be in a range between 380 nm and 3,000 nm, for example, the detection light is violet light having an optical wavelength in a range between 380 nm and 450 nm to far infrared light having an optical wavelength in a range between 800 nm and 3,000 nm; thus, defects in a scale of submicron (e.g., 300 nm) on the surface of the object 10 can be imaged in the detection image by the detection light.

Figure 7:
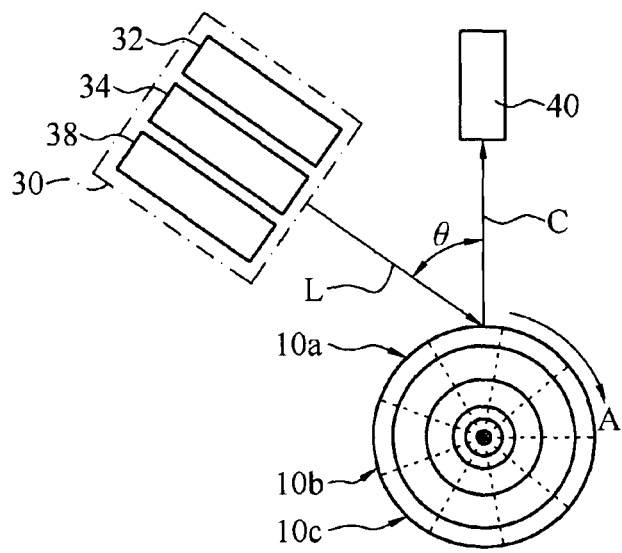
FIG. 7 is a schematic diagram of directions of light in a system for detecting a surface type of an object according to yet another embodiment of the present invention.

FIG. 7 shows a schematic diagram of directions of light in a system for detecting a surface type of an object according to yet another embodiment of the present invention. In some embodiments, the light source component 30 uses light emitting elements 32, 34 and 38 of multiple different spectra to provide light of a plurality of spectra, and the light emitting elements of the different spectra are sequentially actuated, so as to enable the photosensitive element 42 to obtain detection images of multiple different spectra. Herein, the light emitting elements respectively correspond to multiple non-overlapping optical wavebands, and these optical wavebands can be continuous or discontinuous. In some embodiments, each of the light emitting elements can be implemented by one or more light emitting diodes (LED); in some embodiments, each light emitting element can be implemented by a laser source.

For example, the light source component 30 includes a red LED (e.g., the light emitting element 32), a blue LED (e.g., the light emitting element 34) and a green LED (e.g., the light emitting element 38), and causes the different LEDs to sequentially emit light, so as to obtain a detection image of a red spectrum, a detection image of a blue spectrum, and a detection image of a green spectrum.

Refer to FIG. 6. In some embodiments, the light source component 30 includes a light emitting element 32 and a spectroscopic component 36. The spectroscopic component 36 is located between the light emitting element 32 and the detection position; alternatively speaking, the spectroscopic component 36 is located between the light emitting element 32 and the object 10. The spectroscopic component 36 has a plurality of filter regions 362, 364 and 366 respectively corresponding to a plurality of spectra, and a movement component 360. At this point, the light emitting element 32 provides multi-spectrum light to illuminate the detection position. Herein, the multi-spectrum light has sub-light of a plurality of spectra. Thus, by switching the filter regions 362, 364 and 366 of the spectroscopic component 36, one of the filter regions 362, 364 and 366 is driven and moved to the front of the light emitting element 32, hence enabling the light emitting element 32 to illuminate the area on the surface of the object 10 located at the detection position with the sub-light of various spectra through the filter regions 362, 364 and 366, and allowing the photosensitive element 42 to capture the detection images of multiple different spectra. That is to say, the multi-spectrum light emitted by the light emitting element 32 is filtered by any of the filter regions 362, 364 and 366 of the spectroscopic component 36 to become the sub-light of the spectrum of the corresponding filter region, and the sub-light is reflected, upon illuminating the object 10 at the detection position, by the surface of the object 10 and further arrives at the photosensitive element 42. When the same filter region 362, 364 or 366 is aligned with the light emitting element 32, the driver component 20 moves one area 10a, 10b or 10c each time to the detection position, and the photosensitive element 42 captures once after each movement the detection image of the area 10a, 10b or 10c currently located at the detection position, so as to obtain the detection images of all the areas 10a, 10b and 10c on the surface under the same spectrum. Then, the spectroscopic component 36 switches to and aligns another filter region 362, 364 or 366 with the light emitting element 32, and again sequentially moves the areas 10a, 10b and 10c and captures the detection images of the areas 10a, 10b and 10c. The steps above are repeated similarly to obtain the detection images having the spectra respectively corresponding to the filter regions 362, 364 and 366. In other words, the light source component 30 uses the multi-spectrum light emitted by one light emitting element to illuminate the detection position, and then forms the sub-light of one single spectrum from the multi-spectrum light by using the spectroscopic component 36 to illuminate the detection position, hence enabling the photosensitive element 42 to obtain the detection images of multiple different spectra.

Figure 8:
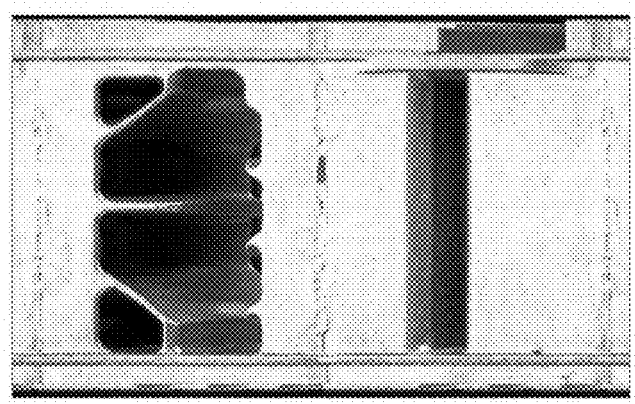
FIG. 8 is a diagram of an example of a detection image according to an embodiment of the present invention.
Figure 9:
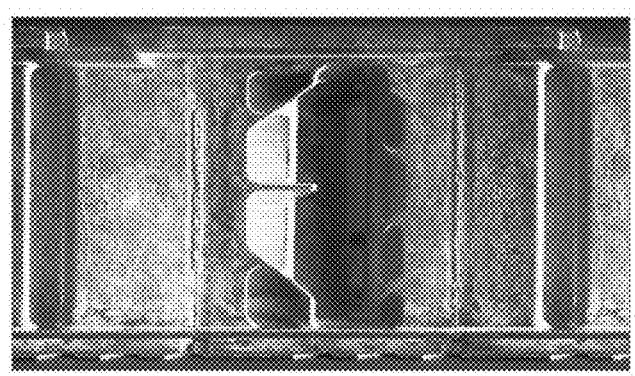
FIG. 9 is a diagram of an example of a detection image according to another embodiment of the present invention.

FIG. 8 shows a diagram of an example of a detection image according to an embodiment of the present invention. FIG. 9 shows a diagram of an example of a detection image according to another embodiment of the present invention. In some embodiments, a detection image obtained under a blue waveband is as shown in FIG. 8, and a detection image obtained under a green waveband is as shown in FIG. 9. Referring to FIG. 8 and FIG. 9, details presented in the detection images under light of different wavebands are different; more specifically, recesses presented in the detection image under the blue waveband are more apparent, and bumps presented in the detection image under the green waveband are more apparent.

Again refer to FIG. 4 and FIG. 6. In one embodiment, the photosensitive element 42 is configured to face the detection position, and a photosensitive axis D (depicted by a dotted line) of the photosensitive element 42 is parallel to a normal line C or is between the normal line C and a first direction A. In other words, a light incident angle θ of light L relative to the normal line C of the area located at the detection position is less than or equal to 90 degrees. Herein, the light incident angle θ refers to an included angle between an incident direction of the light L and the normal line C of the area located at the detection position; when the light incident angle is more than 0 degree and less than or equal to 90 degrees, it means that the detection light illuminates, with the light incident angle θ of more than 0 degree and less than or equal to 90 degrees relative to the normal line C, the area located at the detection position.

Figure 10:
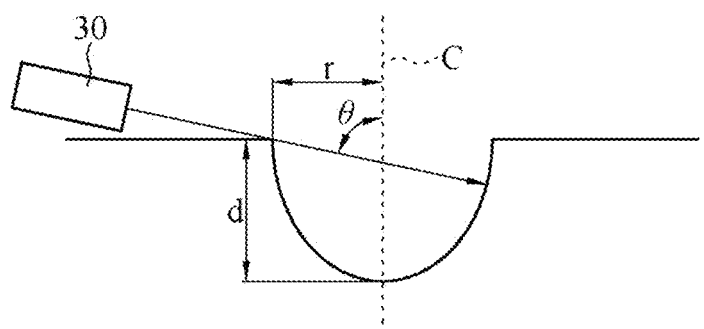
FIG. 10 is a schematic diagram of an implementation form of a surface type of the object in FIG. 7.

FIG. 10 shows a schematic diagram of an implementation form of a surface type of the object in FIG. 7. In some embodiments, the light incident angle θ can be more than or equal to a critical angle and less than or equal to 90 degrees, so as to achieve optimal effects of capturing target features under a wavelength with which detection is to be performed. Herein, the critical angle can be associated with a surface type expected to be detected (to be referred to as a target surface type hereinafter). In some embodiments, the light incident angle θ is associated with an aspect ratio of the target surface type. Herein, the target surface type can be a surface type having a minimum size among surface types expected to be detected by a user. In some embodiments, the critical angle can be an arctangent (r/d), where d is a hole depth of the target surface type and r is a hole radius of the target surface type. For example, referring to FIG. 10, assume that the target surface type is a defect, and assume that the defect has a hole depth d and a hole radius r. Herein, the hole radius r is a distance between any lateral surface in the defect and the normal line C. A ratio of the hole radius r to the hole depth d (r/d) is the aspect ratio (r/d) of the defect. At this point, the light incident angle θ is more than or equal to the arctangent (r/d).

In one embodiment, the photosensitive axis D of the photosensitive element 42 can be parallel to the normal line C or between the normal line C and the tangent of the area of the object 10 located at the detection position, as shown in FIG. 4 and FIG. 6. In one example, the photosensitive axis D of the photosensitive element 42 is parallel to the normal line C, as shown in FIG. 4. In another example, the photosensitive axis D of the photosensitive element 42 and the normal line C have an included angle (to be referred to as a light reflection angle α hereinafter) therebetween. In some embodiments, the light reflection angle α is not equal to the light incident angle θ, so as to minimize glare produced and to further obtain a clearer detection image.

In some embodiments, referring to FIG. 1, FIG. 3 and FIG. 5, the system 1 for detecting a surface type of an object can further include a processor 60. The processor 60 is coupled to the light source component 30, the photosensitive module 40 and the driver component 20. Furthermore, the processor 60 is coupled to the light source component 30, the photosensitive element 42, the spectroscopic component 46, the spectroscopic component 36 and the step motor 24 of the driver component 20, and is for controlling operations of the above components.

Figure 11:
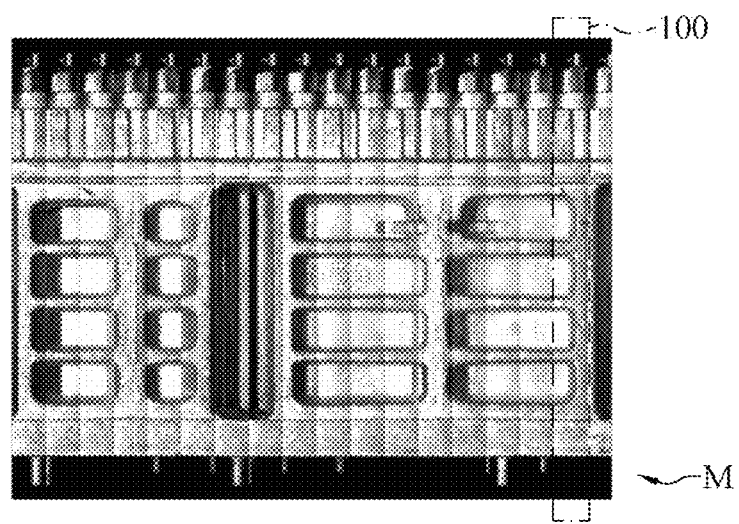
FIG. 11 is a diagram of an object image according to an embodiment of the present invention.

FIG. 11 shows a diagram of an object image according to an embodiment of the present invention. In some embodiments, upon capturing the detection images of all the areas 10a to 10c by the photosensitive element 42, the processor 60 can further combine detection images 100 captured into an object image M according to the capturing sequence.

In one embodiment, the photosensitive element 42 can be a linear photosensitive element; the linear photosensitive element can be implemented by a linear image sensor. At this point, the detection images 100 captured by the photosensitive element 42 can be combined without cropping by the processor 60.

In another embodiment, the photosensitive element 42 is a two-dimensional photosensitive element; the two-dimensional photosensitive element can be implemented by a planar image sensor. At this point, upon capturing the detection images 100 of all the areas 10a to 10c by the photosensitive element 42, the processor 60 captures, based on the short sides of the detection images 100, middle regions of the detection images 100. Then, the processor 60 combines the middle regions corresponding to all the areas 10a to 10c into the object image M.

In one embodiment, referring to FIG. 5, the system 1 for detecting a surface type of an object can be provided with one single photosensitive element 42, and the photosensitive element 42 performs image capturing on multiple areas 10a to 10c to obtain multiple detection images respectively corresponding to the areas 10a to 10c. In another embodiment, referring to FIG. 1, the system 1 for detecting a surface type of an object can be provided with multiple photosensitive elements 401, 402 and 403. The photosensitive elements 401, 402 and 403 are collectively referred to as a photosensitive module 40, and are arranged to face the detection position and on a frame 45 along the long axis of the object 10 (a second direction B). These photosensitive elements 401, 402 and 403 capture detection images of the area located at the detection position for different sections of the object 10, respectively.

In one embodiment, the second direction B is substantially perpendicular to the first direction A. That is to say, the photosensitive axes D of the photosensitive elements 401, 402 and 403 are parallel to the normal line C.

In one example, assume that the object 10 is cylindrical in shape and the system 1 for detecting a surface type of an object is provided with one single photosensitive element 42. The photosensitive element 42 can perform image capturing of the multiple areas 10a to 10c on the body (i.e., the middle sections) of the object 10 to obtain multiple detection images 100 respectively corresponding to the areas 10a to 10c, and the processor 60 then combines the detection images 100 of the areas 10a to 10c into the object image M, as shown in FIG. 11.

Figure 12:
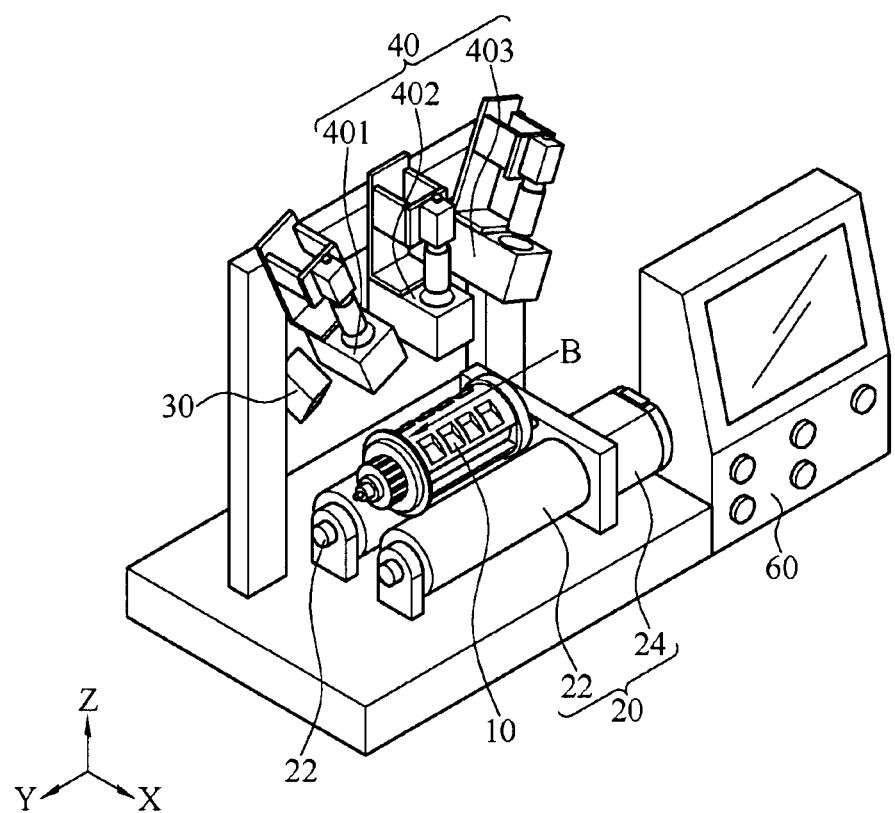
FIG. 12 is a perspective appearance schematic diagram of a system for detecting a surface type of an object according to another embodiment of the present invention.
Figure 13:
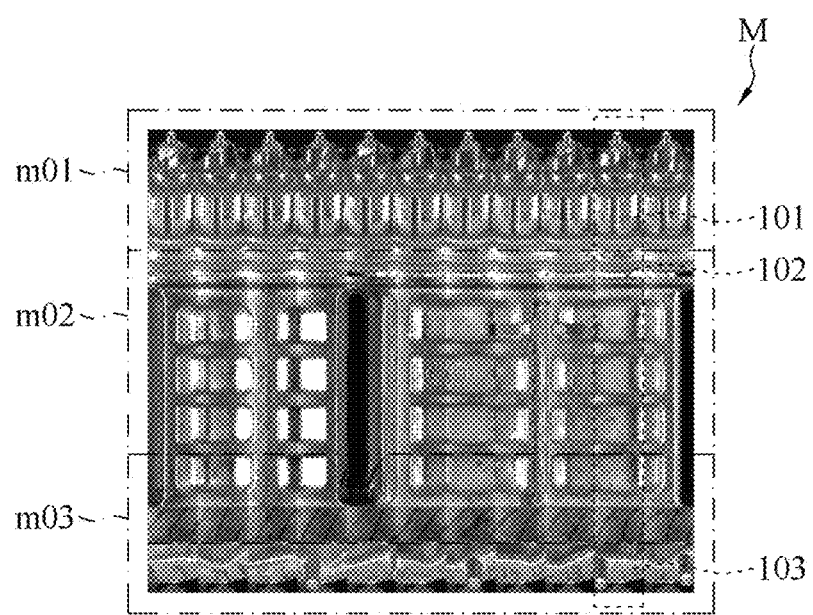
FIG. 13 is a diagram of an object image according to another embodiment of the present invention.

FIG. 12 shows perspective appearance schematic diagram of a system for detecting a surface type of an object according to another embodiment of the present invention. FIG. 13 shows a diagram of an object image according to another embodiment of the present invention. In another example, assume that the object 10 is cylindrical in shape and the system 1 for detecting a surface type of an object is provided with multiple photosensitive elements 401, 402 and 403, as shown in FIG. 12. These photosensitive elements 401, 402 and 403 respectively capture detection images 101, 102 and 103 of different section positions of the surface of the object 10 located at the detection position, and the processor 60 then combines all the detection images 101, 102 and 103 obtained under the same spectrum into the object image M, as shown in FIG. 13.

Refer to FIG. 12. In some embodiments, the photosensitive axis of the photosensitive element 401 and the normal line C have an included angle of more than 0 degree and less than 90 degrees therebetween, the photosensitive axis of the photosensitive element 402 is parallel to the normal line C, and the photosensitive axis of the photosensitive element 403 and the normal line C have an included angle therebetween. For example, because the object 10 can be a conic object or otherwise irregularly shaped, a clearer image can be obtained by adjusting the included angles between the photosensitive axes of the photosensitive elements 401, 402 and 403 and the normal line C.

For example, assume that the photosensitive elements 401, 402 and 403 are in a quantity of three, and the processor 60 combines the detection images 101, 102 and 103 captured by the three photosensitive elements 401, 402 and 403 into the object image M of the object 10, as shown in FIG. 13. The object image M includes a sub object image m01 (the upper part of the object image M in FIG. 13) combined from detection images 101 of all the areas 10a to 10c captured by the first photosensitive element 401 among the three photosensitive elements 401, 402 and 403, a sub object image m02 (the middle part of the object image M in FIG. 12) combined from detection images 102 of all the areas 10a to 10c captured by the second photosensitive element 402 among the three photosensitive elements 401, 402 and 403, and a sub object image m03 (the lower part of the object image M in FIG. 12) combined from detection images 103 of all the areas 10a to 10c captured by the third photosensitive element 403 among the three photosensitive elements 401, 402 and 403.

Figure 14:
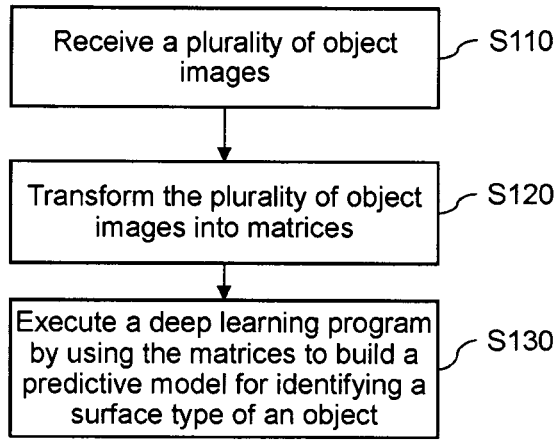
FIG. 14 is a flowchart of an artificial neural network-based method for detecting a surface type of an object according to an embodiment of the present invention.

FIG. 14 shows a flowchart of an artificial neural network-based method for detecting a surface type of an object according to an embodiment of the present invention. Referring to FIG. 14, the artificial neural network-based method for detecting a surface type of an object is suitable for an artificial neural network system. The artificial neural network system has a learning (i.e., training) phase and a prediction phase.

In the learning phase, the artificial neural network system receives a plurality of object images (step S110), wherein a plurality of spectra of the plurality of object images are different from one another, and each object image has one of the plurality of spectra. Herein, the object images are surfaces of same relative positions of the same object. In some embodiments, the object images can also present positions on a surface of the same object 10. For example, the plurality of object images can be object images obtained by performing image capturing on the same surface of the same object 10 under different spectra, as shown in FIG. 11 or FIG. 13. Next, the artificial neural network system transforms the plurality of object images into matrices (step S120), i.e., transforming a data format of the object images into a format (e.g., an image matrix) supported by an input channel of the artificial neural network. An artificial neural network (e.g., implemented by a deep learning program) of the artificial neural network system includes a plurality of image matrix input channels for inputting corresponding matrices, wherein the image matrix input channels respectively represent imaging conditions of a plurality of spectra. That is to say, the object images of different spectra are transformed to information such as length, width, pixel type, pixel depth and channel value in a matrix, wherein the channel value represents an image imaging condition of the corresponding object image. Furthermore, the transformed matrices are imported into the corresponding image matrix input channels according to the imaging conditions of the object images, so as to facilitate subsequent processing.

In one embodiment, the artificial neural network system further includes an image matrix input channel representing grayscale, wherein the image matrix input channel representing grayscale is for importing a matrix of an object image in grayscale. That is to say, the artificial neural network system first transforms the object image M into a grayscale image according to the luminance of the object image M, and then transforms the grayscale image into a matrix.

Then, the artificial neural network system executes a deep learning program by using the matrices to build a predictive model for identifying a target surface type of an object (step S130). In some embodiments, deep learning can be implemented by a convolutional neural network (CNN) algorithm; however, the present invention is not limited to the above example.

That is to say, with respect to the artificial neural network system stored in the processor 60, the artificial neural network system is capable of receiving images having different spectra in the learning phase. Taking the foregoing system for detecting a surface type of an object for example, images of different surface types can be images having different defects, images without any defects, images having different levels of surface roughness, or images having defects presenting different aspect ratios as a result of different levels of contrast generated by illuminating areas on a surface by light of different angles, and the artificial neural network system performs deep learning according to the images of different surface types, so as to build a predictive model (or referred to as a predictive procedure) for identifying various target surface types. In one embodiment, the target surface type is at least two of slots, cracks, bumps and textures; in other words, the predictive model is capable of identifying whether a surface of an object contains slots, cracks, bumps or textures or does not contain any defects.

Figure 15:
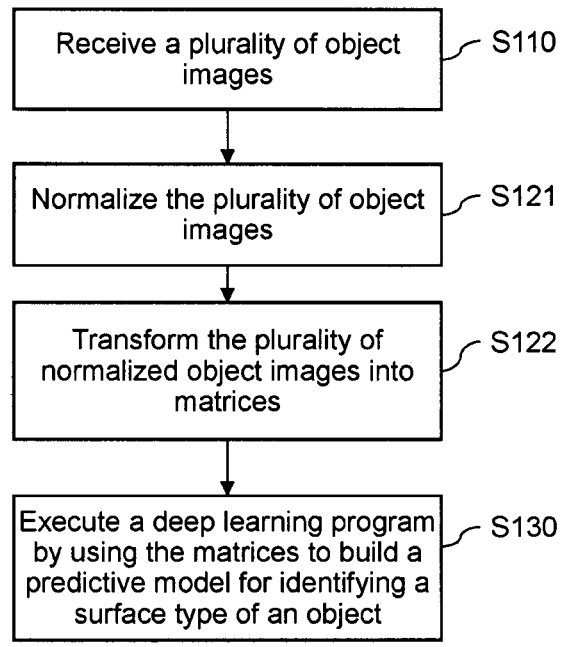
FIG. 15 is a flowchart of an artificial neural network-based method for detecting a surface type of an object according to another embodiment of the present invention.

FIG. 15 shows a flowchart of an artificial neural network-based method for detecting a surface type of an object according to another embodiment of the present invention. Referring to FIG. 15, after the artificial neural network receives a plurality of object images (step S110), the artificial neural network system performs normalization on the plurality of object images (step S121). Herein, the normalization refers to a structural analysis and design for constructing a clearer data mode. Next, the artificial neural network system transforms the plurality of object images after normalization into matrices (step S122), that is, the image format of the plurality of object images after normalization is a data matrix format supported by the input channel of the deep learning program. Thus, asymmetry among learning data is reduced and learning efficiency is at the same time improved.

In some embodiments, in the learning phase, the object images received by the artificial neural network system are known surface types, and surface defect types outputted by the artificial neural network system are also set in advance. In other words, the object images M used for deep learning are all marked with existing object types. For instance, in one example, if an object is an unqualified object, the surface of the object has one or more surface types that the artificial neural network has already learned and attempts to capture, such that the artificial neural network then selects these surface types; conversely, if an object is a qualified object, the surface of the object does not possess any surface types that have been recorded and are used for triggering the selection action of the artificial neural network. At this point, some of the object images received by the artificial neural network system have labels of one or more surface types, and others have labels without any surface types. Furthermore, the output of the artificial neural network system sets in advance a plurality of surface type categories according to these surface types. In another example, if an object is an unqualified object, the surface of the object has one or more first-type surface types; conversely, if an object is a qualified object, the surface of the object has one or more second-type surface types. At this point, some of the object images received by the artificial neural network system have labels of one or more first-type surface types, and others have labels of one or more second-type surface types. Furthermore, the output of the artificial neural network system sets in advance a plurality of surface type categories according to these surface types.

In some embodiments, in the learning phase, the artificial neural network system performs training by using object images with known surface defects so as to generate determination items of the neurons in a predictive model and/or to adjust a weighting connecting any two neurons, such that a prediction result (i.e., the surface defect type outputted) of each object image conforms to the known and labeled as learned surface defects, and a predictive model for identifying target surface types of an object can be built. In the prediction phase, the artificial neural network system performs category prediction on object images of unknown surface types by using the predictive model built. In some embodiments, the artificial neural network system performs percentile prediction on the object image according to target surface type categories, i.e., determining the percentage of possibility that each object image falls within the individual target surface type categories.

In some embodiments, the artificial neural network system includes an input layer and a multiple layers of hidden layers. The input layer is coupled to the hidden layers. The input layer is for performing operations of steps S110 and S120 (and steps S121 and 122) above. The hidden layers are for performing step S130 above.

In some other embodiments, the artificial neural network system includes a pre-processing unit and a neural network unit. The pre-processing unit is coupled to the neural network unit. The pre-processing unit is for performing steps S110 and S120 (and steps S121 and S122) above. The neural network unit is for performing step S130 above. The neural network unit includes an input layer and multiple layers of hidden layers, and the input layer is coupled to the hidden layers.

In some embodiments, the processor 60 can include the artificial neural network system described above, so as to automatically perform categorization of target surface types according to the combined object image M, thereby automatically determining the target surface type of the surface of the object 10. In other words, in the learning phase, the object image M generated by the processor 60 can be subsequently used for training of the artificial neural network system, so as to build a predictive model for identifying a target surface type of an object. In the prediction phase, the object image M generated by the processor 60 can be subsequently used for prediction by the artificial neural network system, so as to perform category prediction on the object image M by executing the predictive model.

In some embodiments, the object image M generated by the processor 60 can be fed into another processor having the foregoing artificial neural network system, so as to have the artificial neural network system automatically categorize a target surface type according to the combined object image M, thereby automatically determining a target surface type of the surface of the object 10. In other words, the artificial neural network system automatically performs training or prediction with respect to the object image M fed thereto.

In some embodiments, the artificial neural network-based method for detecting a surface type of an object of the present invention can be implemented by a computer program product, such that the artificial neural network-based method for detecting a surface type of an object according to any one of the embodiments of the present invention can be completed when a computer (i.e., a processor) loads and executes the program. In some embodiments, the computer program product is a non-transitory computer-readable recording medium, and the program above is stored in the non-transitory computer-readable recording medium and to be loaded by a computer (i.e., a processor). In some embodiments, the program above itself can be a computer program product, and is transmitted by a wired or wireless means into a computer.

In conclusion of the above description, in the system for detecting a surface type of an object and the artificial neural network-based method for detecting a surface type of an object according to an embodiment of the present invention, object images having different imaging effects are provided for the same object by controlling an emission spectrum or an absorption spectrum of the incident light source, thereby enhancing differentiation for various target surface types of an object under image detection. In the system for detecting a surface type of an object and an artificial neural network-based method for detecting a surface type of an object according to an embodiment of the present invention, images of surface textures of multiple spectra can be integrated so as to improve identification for a target surface type of an object, thereby obtaining surface roughness and a fine texture pattern of an object. In the system for detecting a surface type of an object and an artificial neural network-based method for detecting a surface type of an object according to an embodiment of the present invention, a target surface type of an object can be independently determined by an artificial neural network system, such that an inspector is not required to observe the object by naked eyes or touch the object by hands, thereby significantly improving identification efficiency for a target surface type as well as mitigating human misjudgment.

The present disclosure is explained by way of the disclosed embodiments that are not to be construed as limitations to the present disclosure. Without departing from the spirit and purview of the present disclosure, a person of ordinary skill in the art could make slight modifications and changes. Therefore, the legal protection of the present disclosure shall be defined by the appended claims.

What is claimed is:

1. A system for detecting a surface type of an object, the system comprising:
a driver component, carrying the object, wherein a surface of the object is divided along a first direction into a plurality of areas, the driver component further being for sequentially moving one of the plurality of areas to a detection position;
a light source component, configured to face the detection position, providing multi-spectrum light to illuminate the detection position, wherein the multi-spectrum light has sub-light of a plurality of spectra, and a light incident angle of the multi-spectrum light relative to a normal line of the area located at the detection position is more than a critical angle and less than or equal to 90 degrees;
a photosensitive element, configured to face the detection position, wherein a photosensitive axis of the photosensitive element is parallel to the normal line or between the normal line and the first direction; and
a spectroscopic component, located between the photosensitive element and the detection position, having a plurality of filter regions respectively corresponding to the plurality of spectra, wherein the photosensitive element captures a detection image of the area located at the detection position under the sub-light of each of the spectra by means of each of the filter regions;
wherein the spectroscopic component comprises a movement component configured to switch to and align each filter region with the photosensitive axis of the photosensitive element in sequence, and the driver component is configured to again sequentially move each one of the plurality of areas to the detection position for each filter region.

2. The system for detecting a surface type of an object of claim 1, wherein the photosensitive axis and the normal line are spaced by an included angle, and the included angle is not equal to the light incident angle.

3. The system for detecting a surface type of an object of claim 1, wherein the driver component comprises:
a carrier element, carrying the object; and
a step motor, connected to the carrier element, rotating the carrier element so as to drive the object to rotate.

4. The system for detecting a surface type of an object of claim 1, wherein the driver component comprises:
a carrier element, carrying the object; and
a step motor, connected to the carrier element, moving the carrier element along the first direction so as to drive the object to move along the first direction.

5. The system for detecting a surface type of an object of claim 1, wherein the photosensitive element is a two-dimensional photosensitive element.

6. The system for detecting a surface type of an object of claim 5, further comprising:
a processor, coupled to the photosensitive element, capturing, based on a short side of each of the detection images, a middle region of each of the detection images, and combining the plurality of middle regions respectively corresponding to the plurality of areas under the same spectrum to present an object image of the surface of the object.

7. The system for detecting a surface type of an object of claim 6, wherein the processor further comprises an artificial neural network system, the artificial neural network system comprises a plurality of image matrix input channels respectively corresponding to the plurality of object images of the plurality of spectra, so as to execute a deep learning program to build a predictive model for identifying a target surface type of the object.

8. The system for detecting a surface type of an object of claim 1, wherein the photosensitive element is a linear photosensitive element.

9. The system for detecting a surface type of an object of claim 8, further comprising:
  a processor, coupled to the photosensitive element, combining the plurality of detection images under the same spectrum into an object image.

10. The system for detecting a surface type of an object of claim 9, wherein the processor further comprises an artificial neural network system for executing a deep learning program according to the plurality of object images respectively corresponding to the plurality of spectra, so to build a predictive model for identifying a target surface type of the object.

11. A system for detecting a surface type of an object, the system comprising:
  a driver component, carrying the object, wherein a surface of the object is divided along a first direction into a plurality of areas, the driver component further being for sequentially moving one of the plurality of areas to a detection position;
  a light source component, configured to face the detection position, providing multi-spectrum light to illuminate the detection position, wherein the multi-spectrum light has sub-light of a plurality of spectra, and a light incident angle of the multi-spectrum light relative to a normal line of the area located at the detection position is more than a critical angle and less than or equal to 90 degrees;
  a photosensitive element, configured to face the detection position, wherein a photosensitive axis of the photosensitive element is parallel to the normal line or between the normal line and the first direction; and
  a spectroscopic component, located between the detection position and the light source, having a plurality of filter regions respectively corresponding to the plurality of spectra, wherein the photosensitive element captures a detection image of the area located at the detection position under the sub-light of each of the spectra by means of each of the filter regions;
  wherein the spectroscopic component comprises a movement component configured to switch to and align each filter region with emitted light from the light source in sequence, and the driver component is configured to again sequentially move each one of the plurality of areas to the detection position for each filter region.

* * * * *